[19] United States Patent
Vik

[11] 4,009,729
[45] Mar. 1, 1977

[54] HYDRAULIC COUPLER
[75] Inventor: Albam M. Vik, New Brighton, Minn.
[73] Assignee: Dempco, Inc., Minneapolis, Minn.
[22] Filed: Oct. 20, 1975
[21] Appl. No.: 623,791
[52] U.S. Cl. .................. 137/614.05; 137/614.06; 137/614.11; 137/614.19
[51] Int. Cl.² .................. F16L 29/00; F16L 37/28
[58] Field of Search ............. 137/614.04, 614.05, 137/614.06, 614.11, 614.19

[56] References Cited
UNITED STATES PATENTS
3,680,591  8/1972  Vik .......................... 137/614.05

Primary Examiner—Alan Cohan
Assistant Examiner—Gerald A. Michalsky
Attorney, Agent, or Firm—Dugger, Johnson & Westman

[57] ABSTRACT

A hydraulic coupler having an intermediate valve which permits closing off flow from the inlet end to the outlet end, which permits quick coupling, and which provides for substantially leak proof, easy operation during uncoupling and coupling.

11 Claims, 4 Drawing Figures

HYDRAULIC COUPLER

BACKGROUND OF THE INVENTION

1. Field of the Invention

The present invention relates to hydraulic couplers having a lever controlled intermediate valve in the coupler.

2. Prior Art

My U.S. Pat. No. 3,680,591, issued Aug. 1, 1972, for Unique Hydraulic Coupler, shows a cam controlled intermediate valve coupler assembly. In the above mentioned patent, an intermediate valve chamber is provided, and during operation, an external bleed is used to relieve pressure buildup in the chamber when necessary. As shown therein, the bleed is provided by permitting leakage to the exterior of the coupler past provided O rings when an intermediate valve assembly moves to a particular position.

The present device provides an intermediate chamber having a piston that will move slightly when controlled by a cam to relieve pressure in the interior valve chamber. The device is easily made from automatically produced parts, and avoids the possibility of visible external leakage.

SUMMARY OF THE INVENTION

A cam operated hydraulic coupler that permits use of standard coupler nipples in breakaway coupling devices, and which has an intermediate valve assembly that can be cam controlled to close off flow through the coupler. The valve assembly can be used as a flow control valve when the coupler is assembled with a remote nipple, and used as a control for ease of disconnect by hand, or reconnecting by hand even if one or both of the lines to be coupled is under high pressure.

The cam controls an intermediate check valve which mates with a seat in the coupler body and seats with a standard check valve in a remote coupler nipple. The cam, when it is in its on position, also opens an inlet valve, and forces the intermediate valve assembly to position to hold open a standard nipple check valve. Force reaction from the coupler nipple check valve will cause the intermediate check valve to be held open. The intermediate valve is mounted in a chamber defined in part by a piston body. The piston body controls the size of the chamber in which the valve is mounted. The position of the piston body is also determined by the cam control so that when the cam is turned to a selected position, the piston will move to enlarge the chamber for the intermediate valve slightly and relieve any pressure that might be held in the chamber.

The chamber may be under pressure, for example, when the coupler nipple has been "broken away" at a time that the inlet valve is open so that the intermediate valve chamber is charged with the inlet pressure. The intermediate check valve closes when the coupler breaks away to prevent outflow from this chamber once the remote coupler nipple has been removed.

If the cam is then turned to off position the pressure from the inlet can be trapped in the intermediate valve chamber, and this can make recoupling difficult, and also can cause some leakage when recoupling.

The coupler device shown is easily manufactured, and provides safe operation without any external bleeding of the intermediate valve chamber at any time during operation.

DESCRIPTION OF THE PREFERRED EMBODIMENTS

Figure 2:
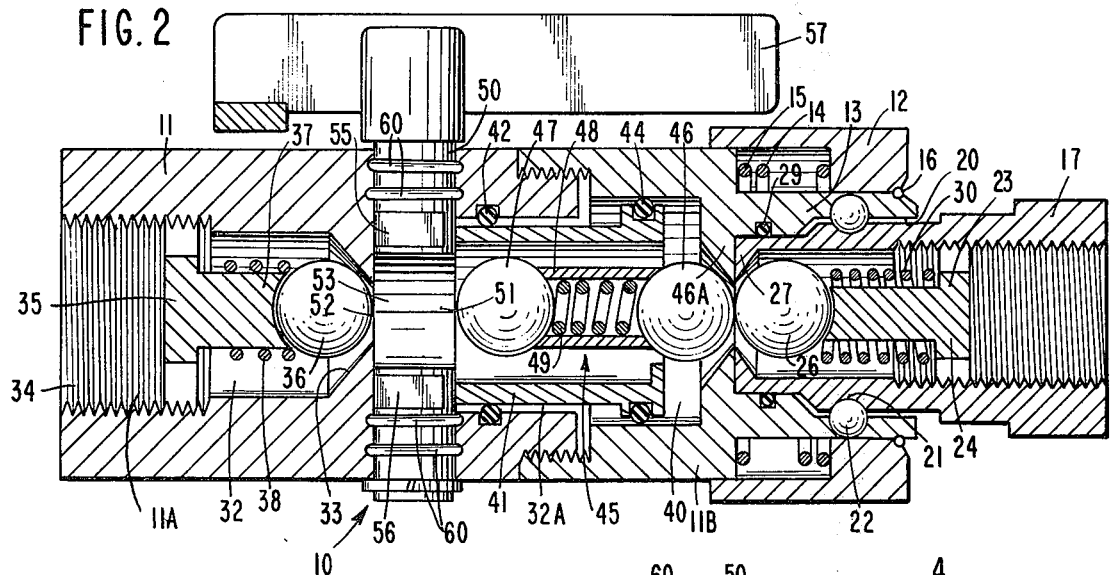
FIG. 2 is a sectional view taken generally along line 2—2 in FIG. 1.

An automatic coupler for hydraulic circuits illustrated generally at 10 includes a main outer body 11, and a coupler control sleeve 12 slidably mounted over one end portion of the outer body, as shown in FIG. 2. The coupler control sleeve has an end shoulder retaining a spring 14 that acts against a shoulder 15 at the end of the outer body to urge the coupler sleeve outwardly against the snap ring 16 positioned in the groove at the outer end of the reduced diameter end portion 13. The interior of the end portion 13 of the main body 11 provides a chamber 20 for a coupler nipple 17 that in turn is threaded internally at one end for attachment to a remote hydraulic hose leading to an implement or other remote hydraulic actuator.

The nipple 17 as shown fits within the interior receptacle 20, and includes an annular groove 21 that is of size to partially receive a plurality of locking balls 22 that are positioned in openings defined in the outer end wall of end portion 13. The sleeve 12 keeps the locking balls 22 positioned inwardly when the sleeve is in its position as shown in FIG. 2 to hold the nipple 17 in place in the chamber 20. An O ring 29 can be position on the interior of this chamber to seal against the outer surface of the nipple 17.

The sleeve 12 can be moved against the force of the spring 14 in the direction toward the shoulder 15 so that only a chambered end portion of the coupler control sleeve 12 overlies the balls 22. This will permit the balls 22 to move outwardly and release the coupler nipple 17 and permit it to be disconnected from the main body portion. This can be done automatically, by holding the coupler control sleeve 12 in a known manner while external forces acting on the coupler nipple will move the nipple and main body 11 relative to the sleeve to release the coupler nipple to provide an automatic breakaway.

The coupler nipple 17 is constructed in a known manner, and has an interior ball retainer 23 threadably mounted therein, which includes a stud 24 that has a part spherical ball seat to mate with a ball check valve 26 that is mounted between the stud 24 and a valve seat 27. The valve seat is formed at the end of the coupler nipple. A spring 30 is mounted over the stud 24 and is used for urging the ball 26 in direction toward the valve seat 27. The stud 24 is selected so that the end of it prevents movement of the ball 26 away from the valve seat 27 more than a preselected amount for purposes that will be discussed subsequently.

The retainer 23 is made in a known manner with flow passageways defined around the periphery thereof so that hydraulic oil can flow through the coupler nipple in a normal manner.

The coupler main body 11, as shown, is made into two sections for assembly purposes. There is a first section 11A, and a second section 11B that is threadably mounted onto the first section. The nipple 17 mounts onto the end of the second section. When threaded together the two sections 11A and 11B form the main body, with a through bore 32. The through bore 32 as shown, has different sized portions, and at the interior of the body portion 11A has a valve seat 33 formed therein.

The inlet end 34 of the main body is threaded, as shown, to receive an inlet pipe or hose connection for hydraulic fluid under pressure. The threads are also used for mounting a valve retainer 35 for an inlet check valve assembly that includes a ball 36, acting in combination with the seat 33 to provide an inlet check valve when the valve ball 36 is not held open. The retainer 35 is similar to the retainer 23, and includes a stud 37 and a spring 38 for acting against the check valve ball 36.

The body portion 11B has an interior chamber 40 defined therein. The end of the bore 32 indicated at 32A in body portion 11A is made of a greater diameter than the bore at the inlet end 34. The chamber 40 and bore portion 32A mount a piston member 41 that is tubular, as shown, and has an outer cylindrical surface that seats against an O ring 42 positioned in the wall forming the bore portion 32A. The piston has an enlarged piston or head end 43 that has an O ring 44 sealing against the interior wall of the chamber 40. The piston is mounted for limited axial movement in the interior of the coupler assembly.

The piston as shown is tubular, and on the interior of the piston a control valve assembly indicated generally at 45 is mounted. This control valve assembly includes a first ball check valve 46, and a second ball member 47 spaced apart by a tube 48 with an interior spring 49 therein. The spring 49 urges the ball members apart, so the ball 46 will be urged toward a valve seat 46A in the body portion 11B. The ball 46 thus forms a check valve in respect to the valve seat 46A and will close or seat to shut off flow from the inlet to the outlet end when the nipple 17 has been removed.

The ball 47 acts against a cam member 50 which extends transverse to the bore as shown, and when the cam is in its position as shown in FIG. 2, the ball 47 acts through the tube 49 against the ball 46 to move the ball 46 to position where it will engage and open the check valve ball 26 at the same time that the ball 46 is spaced from its seat 46A. The tube 48 carries the compressive force from ball 47 to ball 46.

Figure 3:
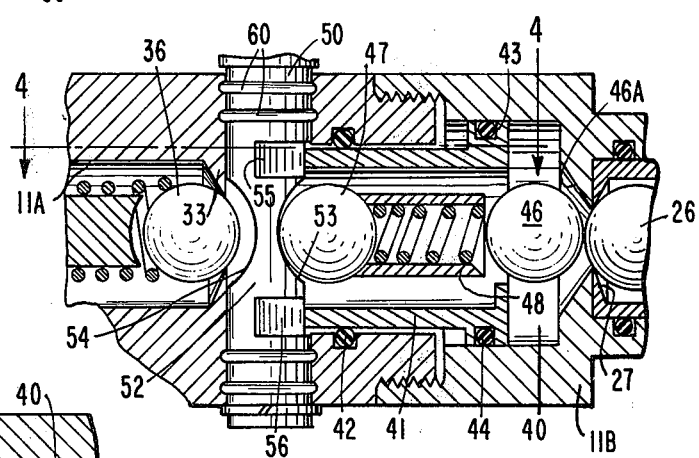
FIG. 3 is a fragmentary vertical sectional view taken on substantially the same sight line as FIG. 2, but with the cam in a low cam position.

The cam 50, as shown has a high cam position shown in FIG. 2, which results in the opening of the coupler nipple valve 26 as just described. The cam is reduced transverse width in direction perpendicular to its position shown in FIG. 2 (as seen in FIG. 3) so that it can be moved to a low cam position as shown in FIG. 3. In FIG. 3, the check valve ball 36 has been permitted to move against the seat 33, under the urging of the spring 38, because pocket 54 of the cam clears the ball 36. The ball 47 is also permitted to move axially in the bore toward the center of the cam into pocket 53, thereby permitting the ball 26 to move against its seat 27.

The control function of the cam will be more fully explained, but as shown when it is in the low cam position, it permits the inlet check valve 36 to close, and also permits the nipple check valve 26 in the nipple 17 to close. It should be noted that the spring 30 is selected to be stronger, or provide greater force, than the spring 49, so that when the cam is in its position as shown in FIG. 3, the ball 26 will be urged against seat 27 and spring 49 will compress.

The position of the cam shown in FIG. 3 prevents flow through the assembly from either direction, that is, from either the inlet 34 to the outlet of the housing, or from the coupler nipple 17 is opposite direction toward the inlet end.

The position of the piston assembly 41 is also controlled by the position of the cam, as can be seen. The end surface of the tubular piston body assembly rides against the cam 50 at the upper and lower end of the cam (on the interior of the bore). It should also be noted that the space between the O ring 42 and the O ring 44 is sealed off from fluid flow, is filled with air, and is at or near atmospheric pressure. That is, hydraulic oil coming from the inlet end of the coupler assembly will pass through the interior of the tubular piston, and will not be permitted to flow into the space between these two O rings. Likewise, fluid under pressure in bore 40 is sealed off from the space between the O rings.

Figure 1:
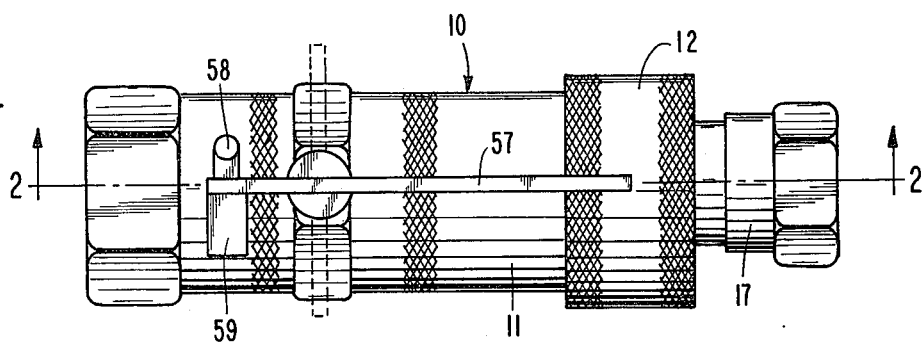
FIG. 1 is a top plan view of a hydraulic coupler made according to the present invention.

When the cam is in its high cam position, or in position as shown in FIG. 2, and in its initial off position which is directly across the cam or at 90° to its initial position as shown in FIG. 3, the piston will remain in substantially the same position within the chamber 40, and will not move. The radius of the surface of the cam 50 acting on the end of the piston wall is substantially the same throughout this travel. However, in addition to the high cam edges 51 and 52 that are shown in FIG. 2 and act against the balls 47 and 36, respectively, and the low cam position wherein pockets 53 and 54 permit the balls 47 and 36, respectively, to move to their respective positions, in FIG. 3, the cam has upper and lower interior piston control surfaces 55 and 56, respectively. These surfaces are formed so that they will control movement only of the tubular piston assembly 41 and will not control the balls 47 and 36. The surfaces are the bottoms of grooves formed into the cam. These surfaces are formed so that when the cam is rotated in a counterclockwise direction as shown in FIG. 1, that is, past its normal right angle position, the surfaces 55 and 56 will permit the piston assembly 41 to move toward the axis of the cam a slight amount thereby permitting the piston head end 43 to move in the chamber 40 in a direction toward the cam 50 and body portion 11A to its position shown in FIG. 4. Assuming that the nipple 17 is removed, and both valve balls 26 and 46 are seated, any pressure on the interior chamber 40 in the coupler will be relieved because of the increased volume of the chamber 40 as the piston head 43 moves. Also, even with the coupler nipple 17 in place, the movement of piston head 43 will permit the ball 26 to seat, closing off back flow and relieving pressure in the chamber 40. The air between the O rings 42 and 44 may escape through the threads attaching the body portion 11A and 11B to permit this movement of the piston. Once the pressure in chamber 40 is relieved or reduced by the cam action the coupler nipple can be removed or replaced with little effort. The enlarged head 43 of the piston provides a differential surface toward cam 50 by pressure in the chamber 40.

The cam 50 is controlled through the use of a lever 57. The lever can have a suitable detent member 58, and stop member 59 to prevent its movement beyond its "on" position if desired. The cam itself can be sealed with suitable O rings 60 and held in position in any desired way.

Figure 4:
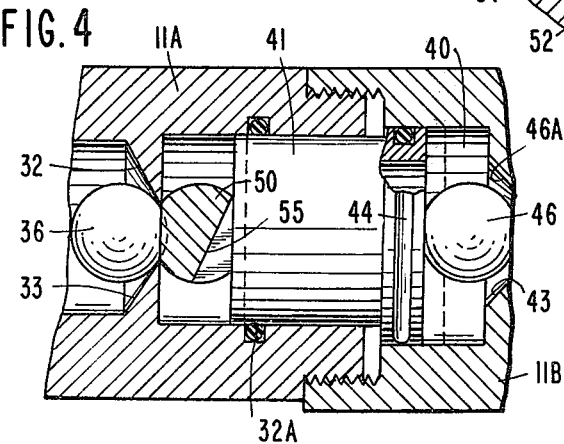
FIG. 4 is a sectional view taken generally along the line 4—4 in FIG. 3, but with the cam rotated beyond its position shown in FIG. 3.

In a situation where the inlet end 34 is under pressure, and the coupler nipple 17 is broken away, the ball 46 will immediately seat against seat 46A preventing flow out of the coupler. However, then the chamber 40 is charged with pressure from the inlet end, and when the cam is turned to its off position, even with the ball 36 seated against the seat 33 there will still be fluid under pressure trapped in the chamber 40. It can be seen then that if the coupling is to occur, it would be necessary to overcome the force on the ball 46 caused by the pressure in chamber 40 in order to move it rearwardly away from the seat 46A as it is coupled. This requires a high coupling force, and also would permit leakage because of the pressure in the chamber 40. However, turning the cam 50 farther than its normal "off" position as illustrated in FIG. 4 so that the piston 41 can move to its dotted line position as shown in FIG. 2, and the position shown in FIG. 4, the pressure in the chamber 40 will be relieved. The pressure in chamber 40 moves the piston to enlarge the chamber and the air between O rings 42 and 44 may compress slightly and escape to atmosphere through the threads between body portions 11A and 11B.

Thus, no external oil bleed is necessary to relieve pressure in the chamber holding the intermediate valve that provides the flow control through the coupling.

If the coupler nipple is still in place in the coupler body and there is pressure in the remote line, closing off the cam will cause ball 26 to seat because of the spring 30 which is of greater force than spring 49. Then moving the cam to position to permit surfaces 55 and 56 to allow movement of the piston assembly will relieve the pressure in the chamber 40 because the chamber 40 will be isolated by the closed inlet check valve and the closed reverse flow check valve in nipple 17. If ball 26 does not fully seat before the piston moves in chamber 40, it will seat tightly as soon as the pressure in chamber 40 starts to drop because of the pressure in the nipple acting on ball 26.

What is claimed is:

1. In a hydraulic coupler attachment device including a coupler body having an interior passageway, a manually controllable inlet check valve, and a manually operable outlet check valve in said interior passageway, said inlet check valve and said outlet check valve defining a chamber on the interior of said coupler body between said valves, the improvement comprising a movable wall defining a portion of said chamber, and means exterior of the chamber operatively associated with said movable wall to move the wall to enlarge said chamber at selected times.

2. The hydraulic coupler of claim 1 wherein said means exterior of said chamber comprises manual control means including cam means defining cam surfaces controlling positions of said inlet and outlet check valves.

3. The hydraulic coupler of claim 2 wherein said means defining cam surfaces is a rotatable cam having a first position wherein the inlet valve is held open, said cam being rotatable to a second position wherein the inlet valve is permitted to close and said cam being rotatable to a third position wherein said cam permits said movable wall to move to enlarge the size of said chamber when said chamber is under pressure.

4. The coupler assembly of claim 3 and means operatively associated with said outlet check valve positioned between said cam and said outlet check valve comprising a mechanical noncompressible means acting between said outlet check valve and said cam to hold said outlet check valve in a selected position when the cam is in a high cam position, said movable wall means comprising a piston wall surrounding said mechanical means, said piston wall being sealed to define a separate chamber filled with compressible fluid isolated by said piston wall from said chamber in the coupler body.

5. The combination as specified in claim 4 wherein said piston wall has a head end of a larger diameter than the main portion of said piston wall, said sealing means including a seal at said head end sealing the chamber in said coupler body from the chamber filled with compressible fluid.

6. The combination as specified in claim 4 wherein said cam includes surfaces adjacent opposite ends thereof of size to engage portions of said piston wall to permit said piston wall to be controlled by said cam for movement to permit enlarging said chamber in said coupler body.

7. The combination as specified in claim 4 wherein said coupler body includes releasable means for holding a coupler nipple in position at one end thereof, a coupler nipple mounted in said releasable means, said coupler nipple including a check valve mating with the outlet check valve and being urged to engage said outlet check valve to move said outlet check valve to an open position, said mechanical means permitting said outlet check valve to move to said open position but not substantially beyond the open position when the cam is in its first position, whereby both the check valve in said coupler nipple and said outlet check valve are held open.

8. The combination as specified in claim 7 wherein said check valve in said coupler nipple is designed to check flow from said coupler nipple toward said inlet check valve in said coupler body.

9. A coupler assembly including a body member having a through bore, means at one end of said body member for holding a coupler nipple check valve in position thereon, means on the interior of said body member defining an inlet check valve to check flow from the inlet end toward said coupler nipple when in closed position, means on said body member defining an outlet check valve to check flow from the inlet end toward said coupler nipple when in closed position, a cam member mounted on said coupler body and being positioned so that in a high cam position said cam member holds said inlet check valve in an open position, means acting between said cam member and said outlet check valve to prevent said outlet check valve from moving beyond a selected open position when the cam member is in the high cam position, said outlet check valve cooperating with a coupler nipple attached to said coupler body so the outlet check valve is held in an open position when the cam member is in high cam position, said outlet check valve comprising a check valve member mounted in a chamber defined between the inlet check valve and the outlet check valve, said coupler assembly including movable wall means forming a portion of said chamber, and means acting between said cam member and said movable wall means to permit said movable wall means to vary the size of said chamber in response to movement of said cam member.

10. The combination as specified in claim 9 wherein said movable wall means comprises an annular wall slidably mounted in the through bore of said body member, sealing means cooperating with said movable wall to said chamber in which the outlet check valve is mounted.

11. The combination as specified in claim 10 wherein said sealing means are positioned to provide an area pressure not significantly higher than atmospheric pressure on a side of the sealing means opposite said chamber, whereby pressure in said chamber will cause said movable wall means to tend to move to expand the size of said chamber, said cam restraining movement of said movable wall except in a selected cam position.

* * * * *